INVENTOR.
WILLIAM C. DEAN

INVENTOR.
WILLIAM C. DEAN

United States Patent Office 2,963,647
Patented Dec. 6, 1960

2,963,647

ELECTRICAL TRANSIENT ANALYZER

William C. Dean, Indiana Township, Allegheny County, Pa., assignor to Gulf Research & Development Company, Pittsburgh, Pa., a corporation of Delaware Filed May 15, 1958, S.er. No. 735,470

3 Claims. (Cl. 324—77)

This invention relates to an apparatus for analyzing electrical transients, and in particular relates to an apparatus for quickly obtaining the coefficients of the respective members of a Laguerre series whose sum corresponds to the transient being analyzed.

There are numerous occasions in electric-circuit techniques and in communication techniques where it becomes important to have an analysis of various electrical signals being investigated. Such analyses generally express the signal in terms of a sum of simpler signals of a particular form on which computations can be made that cannot be made on the complex original signal. For example it is well known that a periodically-recurring signal can be analyzed into its harmonics. By means of appropriate well-known electrical techniques the amplitude and phase relation of all steady-state components whose frequencies are respectively that of the fundamental frequency of recurrence ($n$) and frequencies which are multiples of the fundamental frequency, namely $2n$, $3n$, etc. can be determined. These are called the harmonics. A complete analysis will specify the amplitude and phase of each harmonic component that makes up the recurring signal, and if a sufficiently large number of harmonic components are determined the precision of the analysis may be made to have any desired degree. Such an analysis is well known and is called a harmonic analysis or a Fourier analysis. In analytic form the recurring signal may be called a function and this function is represented by a summation of the harmonic terms, the summation being termed a Fourier series. The various members of the series are sine and cosine functions each of which has a coefficient which represents the amplitude of the particular harmonic term. Such a Fourier analysis may be performed analytically for simple functions. The Fourier series, whether obtained analytically or experimentally, is often termed a harmonic analysis and the apparatus for making such analyses is called a harmonic analyzer. There are many known devices for performing such an analysis. However, a Fourier analysis can be employed to give a satisfactory representation only for a periodically-recurring signal and it does not give satisfactory results for nonrecurrent or transient phenomena.

It has been found that the general type of decaying transient which is characteristic of electrical circuits may be expressed in the form of a Laguerre series. This may be written as $F(t) = \Sigma a_n \cdot l_n(t)$ in which $a_n$ is a coefficient that may be either plus or minus, and $l_n(t)$ is a Laguerre function of degree $n$. The Laguerre functions are oscillating functions whose amplitude decays exponentially with time. The spacing of zero crossings of the Laguerre functions is generally not uniform but increases with time, i.e. the successive zeros are farther and farther apart in time. The Laguerre functions have been computed analytically and are well known to mathematicians and engineers. (For a mathematical discussion of Laguerre polynomials see for example: P. R. Aigrain and E. M. Williams, "Design of Optimum Transient Response Amplifiers," Proc. I.R.E., vol. 37, pp. 873–879, August 1949; D. Jackson, "Fourier Series and Orthogonal Polynomials," Carus Monograph No. 6, The Math Assn. of America, Oberlin, Ohio, 1941; G. Szego, "Orthogonal Polynomials," Am. Math Soc. Coll. Pub., vol. 23, 1939; E. E. Ward, "The Calculation of Transients in Dynamical Systems," Proc. Cambridge Phil. Soc., vol. 50, Part I, pp. 49–59, January 1954.)

Any transient which gradually decays with time can be represented by the sum of certain Laguerre functions $l_n(t)$ each multiplied by an appropriate coefficient $a_n$. These Laguerre functions have the form of a decaying oscillation. Accordingly it is much simpler and often much more informative to the engineer concerned with the analysis of a transient to obtain a Laguerre analysis rather than a Fourier analysis. Particularly in electrical-network design a knowledge of the various Laguerre terms and their respective coefficients which make up the particular transient obtained from the network is extremely useful. Such a Laguerre analysis has been found useful in analyzing the behavior of electrical networks and other devices which oscillate in a decaying manner as a result of some source of disturbance. A Laguerre analysis may be made analytically if a graph of the transient function is available, but this is a laborious process even if done on an electronic digital computer, and a computed analysis is subject to error because of the necessity of computing specific points on the function graph.

It is apparent that in specifying a Laguerre analysis one must specify the coefficient $a_n$ for each term of the Laguerre series up to the highest term $l_n(t)$ which contributes appreciably to the shape of the transient being investigated. It is the purpose of this invention to provide a method and apparatus for performing an analysis whereby these coefficients are quickly, easily, and accurately obtained for any transient function. The invention is particularly useful for quickly obtaining a Laguerre analysis of an electrical transient, but may be employed to obtain a Laguerre analysis of any function which may be recorded in phonographically-reproducible form.

In the drawing which forms part of this specification

This invention comprises recording the transient to be investigated and the instant of its initiation in reproducible form and playing the transient back in reverse time through a particular type of filter network from which the signal is sampled at appropriate points and displayed on a cathode-ray oscilloscope. The deflection of the C.R. spot at the instant of initiation of the original transient is then the amplitude of the particular Laguerre term which is related to the sample point to which connection has been made. By successively connecting the C.R. tube to the various sampling points as many Laguerre terms as desired can be evaluated.

The apparatus of this invention in its preferred embodiment comprises a magnetic tape recorder on which there is recorded in time coordination the original transient and the instant of initiation of the transient. The record is then reproduced in reverse time and the pick-up head is connected to an electrical network having sections whose respective impulse responses correspond to Laguerre functions. The network has a sampling point at each section and these are connected in succession to a cathode-ray oscilloscope. A separate track on the original magnetic tape is used to identify the initial instant of the original transient. During reverse play-back this instant is identified on the C.R. screen in appropriate manner so that the deflection of the C.R. spot may be measured at this point, and this deflection is a measure of the coefficient ($a_n$) for the Laguerre term characterizing the sampling point to which the C.R. tube is connected.

In describing the invention reference will be made to the analysis of electrical transients, but it is to be understood that this is merely by way of illustrating an application of the invention, and that the invention may be employed as well for analyzing transient effects in mechanical or other types of vibratile systems.

Figure 1:
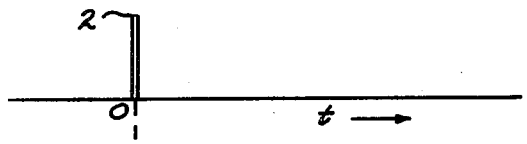
Figure 1 shows a plot of the type of source impulse which gives rise in electrical circuits to transients of a type particularly amenable to a Laguerre analysis.

Referring to Figure 1 there is shown a graph of an impulse disturbance of a type which when applied as the input to a vibratile system results in a decaying transient output having the general shape of the Laguerre functions. Figure 1 shows a plot of an input parameter which may for example be the input voltage applied to an electrical network. The voltage is zero until the time zero, whereupon the voltage suddenly attains a value ($e_i$) indicated at 2 for a very short instant of time ($\Delta t$), and then falls suddenly again to zero. Such an impulse is called a Dirac delta function and is defined by the expression $$\lim_{\Delta t \longrightarrow 0} [e_i \cdot \Delta t] = 1$$

Figure 2:
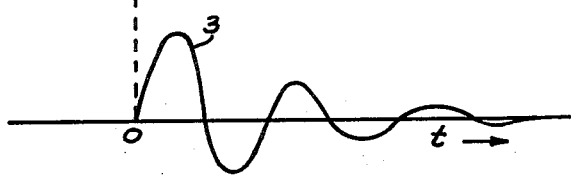
Figure 2 shows a plot of a typical decaying transient which may be the impulse response of an electric circuit.

Such an impulse will elicit a response from a vibratile system to which it is applied which is of the general type illustrated in Figure 2.

Figure 2 is a graph of the output disturbance produced by a vibratile system when the system is subjected to the input impulse disturbance of Figure 1. The system remains at rest until the time $t=0$ and subsequently executes oscillations 3 which gradually decay in time approximately in the manner illustrated in Figure 2 although many variations of this simple graph are commonly observed. The plot of Figure 2 may be that of the output voltage of an electrical network when subjected to the input impulse of Figure 1, but it may be the plot of the impulse response transient of any vibratile system. Impulse responses similar to 3 of Figure 2 are observed in many engineering applications, and engineers are commonly faced with the problem of analyzing such a transient. This invention provides a simple way of analyzing the transient in terms of Laguerre functions.

Figure 3:
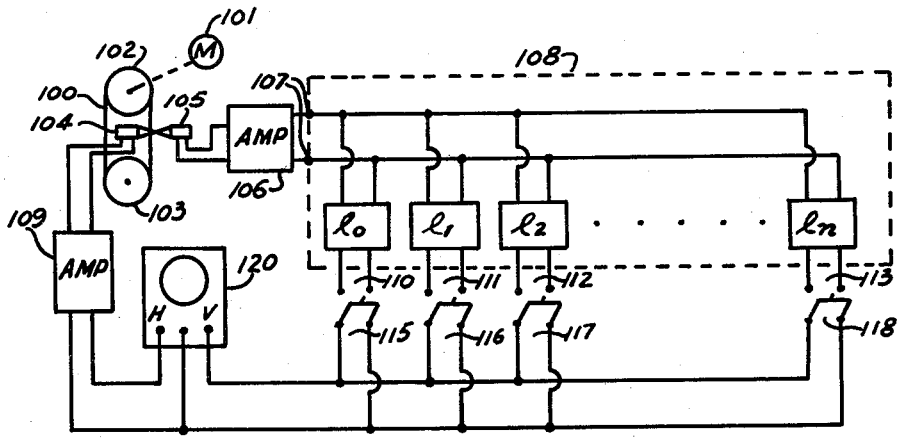
Figure 3 shows a schematic diagram of this invention.

Figure 3 shows a schematic diagram of the invention. An endless magnetic tape 100 is driven by a constant-speed motor 101 around the capstans 102 and 103. The magnetic tape preferably has two tracks which are engaged respectively by magnetic heads 104 and 105. The heads 104 and 105 are shown in Figure 3 as engaging opposite sides of the tape 100, but this is merely for clarity of illustration and the heads 104 and 105 would ordinarily be side by side and engage the tracks on the same side of the tape 100. The transient (Figure 2) to be analyzed is recorded with high fidelity on one track of the magnetic tape 100 and the input impulse (Figure 1) that gives rise to the transient is recorded with high fidelity on the other track in time coordination in conventional manner. This may be done with the apparatus comprising elements 100–105, or the recording may be done on a separate recorder if desired. However, during the ensuing analysis the magnetic tape 100 is run past the heads 104 and 105 in a direction opposite to the recording direction, and this reverse play-back is an important element of this invention.

On reverse play-back the output of head 105 is fed to a high-fidelity amplifier 106 whose output is fed to the input terminals 107 of a particular type of filter indicated generally by the dotted outline 108. The filter 108 will be more specifically described in detail later in connection with Figure 4, but it is characterized in having a series of output terminals 110, 111, 112, etc. 113 which may be separately connected by means of switches 115, 116, 117, etc. 118 to the vertical deflecting plates of a cathode-ray oscilloscope 120. The switches 115—118 are closed only one at a time as will be explained later. Also during the reverse play-back the output of the head 104 is fed to a high-fidelity amplifier 109 and thence to the horizontal deflecting plates of the cathode-ray oscilloscope 120. In operation the oscilloscope spot will move up and down in response to the voltage developed at that one of the terminals 110—113 whose switch 115—118 is closed, and when the sharp input impulse as recorded on the magnetic tape passes the head 104, the cathode-ray spot will show a short momentary horizontal pip whose significance will be explained.

Figure 4:
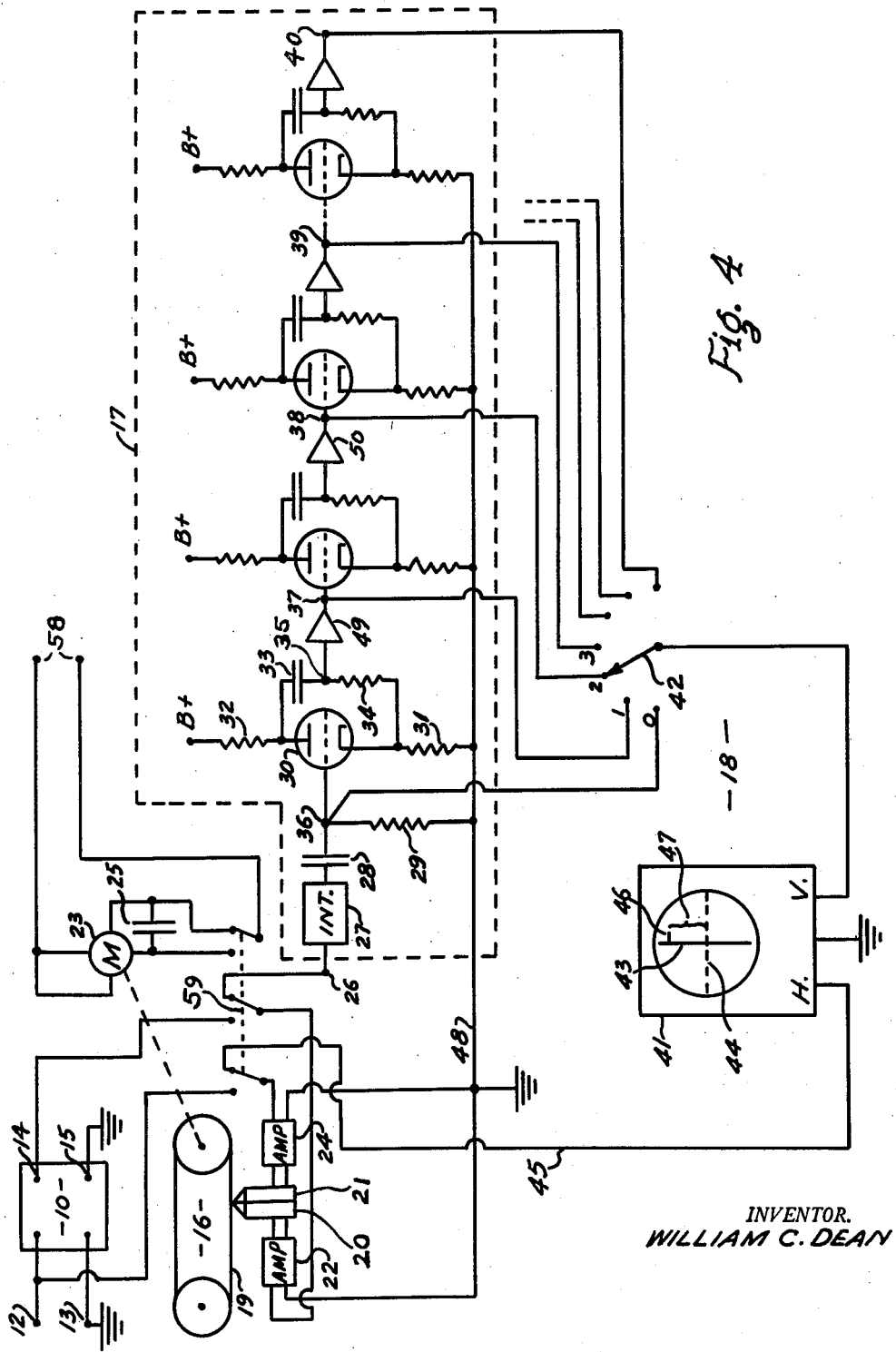
Figure 4 shows a detailed wiring diagram of a preferred embodiment of this invention.

The special filter 108 is of such a form that if it alone were subjected to an input impulse of Figure 1 applied to its input terminals 107, the filter would produce at the respective terminals 110—113 a voltage that is of the form of a member of a Laguerre series. For example, the filter 108 may be such as to produce at terminals 110 a voltage having the form of the Laguerre function $e^{-t} \cdot L_0(2t)$ where $L_0(2t)$ is the Laguerre polynomial of degree zero, and to produce at terminals 111 a voltage having the form of the Laguerre function $e^{-t} \cdot L_1(2t)$ where $L_1(2t)$ is the Laguerre polynomial of degree one, and to produce at terminals 112 a voltage having the form of the Laguerre function $e^{-t} \cdot L_2(2t)$ where $L_2(2t)$ is the Laguerre polynomial of degree two, and so on. Thus the filter 108 must produce at its several output terminals a voltage of the form $e^{-t} \cdot L_n(2t)$ where $L_n(2t)$ is the Laguerre polynominal of degree $n$. A specific type of such a filter is shown in Figure 4 to be described later.

The terms $e^{-t} \cdot L_n(2t) = 1_n(t)$ are the Laguerre functions that are members of the Laguerre series into which the transient is to be analyzed. There are many types of such Laguerre functions but those of the form $$e^{-t} \cdot L_n(2t)$$

are most commonly used for electrical transients. However other forms of Laguerre functions may be used provided only that a filter 108 can be designed that will behave as indicated, namely when itself subjected to the Dirac delta function input, it produces voltages that correspond to the terms of the Laguerre series of interest.

In Figure 3 the various terminals 110—113 are indicated as connected to separate elements $l_0$, $l_1$, $l_2$, etc. $l^n$ which are connected in parallel to the input terminals 107 but this is merely by way of schematic representation, and the elements $l_0$ to $l_n$ may be connected internally in the filter 108 in any manner which will provide the specified impulse response characteristic. By way of example, the elements $l_0$ to $l_n$ may be cascaded sections of a lattice or ladder network as exemplified by the circuit of Figure 4.

If the respective terminals 110—113 produce on impulse excitation of the filter 108 voltages which correspond to the respective members of a Laguerre series, then it can be shown analytically that when the transient is applied to the terminals 107 in reverse time the instantaneous voltage at the respective terminals 110—113 measured at the particular instant $t=0$ when the original transient was initiated, is proportional to the coefficient $a_n$ of that respective term of the Laguerre series. This instant is identified by the horizontal pip on the cathode-ray trace. Accordingly in order to make a Laguerre analysis it is merely necessary for the operator to singly close the switches 115—118 and for each case measure the distance of the horizontal pip from the center line ($x$-axis) of the cathode-ray tube. The coefficients $a_n$ may be either positive or negative and this is indicated by whether the pip is above or below the $x$-axis of the cathode ray tube. Other means of measuring the instantaneous voltages at the instant $t=0$ in the reverse playback will be evident to those skilled in the art, and the system here described is by way of example only. An embodiment of the invention for analyzing an electrical transient will now be described.

Figure 4 shows a detailed wiring diagram of a preferred embodiment of the apparatus of this invention. It may be assumed that some electrical device, such as that exemplified by the four-terminal electrical element 10, is subjected to an input impulse of the type shown in Figure 1. The input impulse is applied to the input terminals 12 and 13. The device 10 produces an impulse response of the general type illustrated in Figure 2, which response is delivered at terminals 14 and 15. The device 10 does not in any way form part of this invention and is shown merely for purposes of illustrating an application of the invention. One input terminal of the device as 13, and one output terminal as 15, may be connected to ground as indicated. The problem to which this invention is directed is to determine a Laguerre analysis of the impulse response transient delivered at terminal 14, i.e. the impulse response is to be represented by the Laguerre series $$\sum_0^n a_n \cdot l_n(t)$$

where $a_n$ is a numerical coefficient that may be either positive or negative and $l_n(t)$ is a Laguerre function of degree $n$. Any appropriate form of Laguerre function may be used, a commonly used form being $e^{-t} \cdot L_n(2t)$ where $L_n(2t)$ is the Laguerre polynominal of degree $n$ and $e$ is the base of natural logarithms (cf. above-mentioned Ward publication).

The apparatus comprises three main parts namely a reversible magnetic recorder indicated generally by 16, an extended ladder network with certain auxiliary circuits indicated generally by 17, and a switching mechanism and cathode-ray oscilloscope indicated generally by 18.

The transient to be analyzed is transmitted from its source 14 to a conventional high fidelity amplifier 22 and thence to a magnetic recording head 20. The input impulse required to identify the instant $t=0$ is transmitted from terminal 12 to a conventional high-fidelity amplifier 24 and thence to a magnetic recording head 21. The magnetic heads 20 and 21 are associated so that their respective signals are recorded in time synchornization for example by affixing the heads side by side. The magnetic tape 19 is wide enough to accommodate two channels and is driven by a reversible motor 23. During the recording process a three-pole double-throw switch 59 is thrown to the left (i.e. opposite to that shown in Figure 3) so that the connection from the source 14 is through the middle pole of the switch to the amplifier 22 and thence to the magnetic head 20. The magnetic recorder 16 is preferably of a type having an endless recording medium, such as tape 19 driven by a capacitor-type synchronous motor 23. The motor 23 is driven by A.-C. power supplied to terminals 58. The direction of rotation of motor 23 is reversed by interchanging the phase to which the capacitor 25 is connected in conventional manner. Coincident with the beginning of the recording of the transient by the magnetic head 20, the associated magnetic head 21 records the input impulse applied to the input terminal 12 of the device undergoing study. Connection is made from terminal 12 through the left-hand pole of switch 59 to amplifier 24 and the head 21. The tape 19 will then have recorded on one of its channels the transient to be analyzed which is similar to Figure 2, and on its other channel the impulse which causes the transient and which will have a form similar to Figure 1. Amplifiers 22 and 24 are conventional and preferably match the recording heads 20 and 21 so as to provide records on the magnetic tape 19 having the highest practicable fidelity. Provision is made in the magnetic recorder 16 so that recording takes place during only one revolution of the magnetic tape 19 and thereafter the signal is cut off. The time duration of one revolution of tape 19 should of course be long enough to record the entire transient arising from terminal 14. Means may be provided for automatically applying the impulse 1 at terminal 12 of the device at the start of a revolution of the magnetic tape 19 as is customary in recording transients. On tape 19 the input impulse 2 of Figure 1 and the response transient 3 of Figure 2 are recorded in their proper time relation, i.e. the impulse 2 occurs at the instant of initiation of the transient 3.

In order to make the Laguerre analysis the switch 59 is thrown to the right as shown in Figure 4. This transfers the motor condenser 25 to the opposite phase so as to revese the direction of rotation of the magnetic tape drive motor 23. Switching means are provided in association with switch 59 to appropriately change the connections of amplifiers 22 and 24 so that these amplifiers now amplify at high fidelity the signal picked up by the magnetic heads 20 and 21 respectively. These switching means are conventional and are not shown in Figure 4 in the interest of clarity. The transient record channel of the magnetic head 20 is connected through amplifier 22 to terminal 26 which is the input terminal of network 17 to be described. The magnetic head 21 will now play back the input impulse through amplifier 24, and this is impressed on a cathode-ray tube as will be described later. Because the input impulse is symmetrical (see Figure 1), the reproduction in reversed time will be substantially the same as the original input impulse. However, the reversed time reproduction of the transient (Figure 2) will be very markedly different from the signal originally recorded because of the time reversal.

The electrical network 17 comprises an auxiliary network including an integrator 27 connected as shown in Figure 4 to a series circuit of condenser 28 and resistor 29. The integrator is conventional and an example will be described later. The voltage across resistor 29 is fed into an extended ladder network whose successive sections are similar and therefore only one of these will be described. Each section of the ladder network comprises the circuit of a tube 30 followed by an amplifier 49. Tube 30 is preferably a triode as for example one unit of a type 12AU7 tube, but may be a multi-element tube connected for triode operation. The cathode of the tube 30 is connected to ground through cathode resistor 31 and the plate (anode) of the tube is connected to the B-voltage supply through resistor 32. The resistances of resistor 31 and resistor 32 are the same, but their value need not necessarily be the same as that of similar resistors in each of the other ladder sections. By way of example, resistors 31 and 22 may each be of the order of 1000 ohms. Connected from the plate to the cathode is a series circuit comprising condenser 33 and resistor 34. In each of the sections of the ladder the product of the capacity (C) of condenser 33 and the resistance (R) of resistor 34 must be constant. The product of the capacity (C) of condenser 28 and the resistance (R) of resistor 29 of the auxiliary circuit must also equal the same constant. This may be expressed as $C_{28} \cdot R_{29} = C_{33} \cdot R_{34} =$ constant. By way of example, condensers 28 and 33 may have values of the order of 0.005 mfd. and resistors 29 and 34 may be of the order of 1 megohm. The output of the tube circuit is taken at the common junction 35 of condenser 33 and resistor 34. Inasmuch as a small amount of attenuation occurs in each of the tubes 30 it is preferred to insert an amplifier 49 after each tube circuit so that the signal developed at the output point 37 of each ladder section is the same as the voltage applied to the input point 36 of the same described in detail later.

It can be shown that the impulse response developed by the extended network shown in Figure 4 when an impulse of the nature of that shown in Figure 1 is impressed on terminal 26 will be such that the voltages obtained at the terminals 36, 37, 38, 39, etc. 40 will correspond to Laguerre functions of the form $e^{-t} \cdot L_n(2t)$ where $L_n(2t)$ are Laguerre polynomials of degree respectively 0, 1, 2, 3, etc., $n$. It is essential in this invention that the network between the terminals 26 and 40 and indicated generally by 17 shall have an impulse response corresponding to Laguerre functions. It is to be noted however that during operation for analyzing a transient, the input impulse shown in Figure 1 is not impressed on the network 17. In this invention the network 17 is subjected to the transient of Figure 2 reversed in time.

The transient of Figure 2 reversed in time and as picked up by the magnetic head 20 is impressed on the network 17. The resulting voltage developed at the points 36, 37, 38, 39, etc. 40 are successively connected to one terminal of a cathode-ray oscilloscope 41 by means of selector switch 42. Each of the points 36–40 are connected to one point of the selector switch 42 whereby the voltage of any one of the points 36–40 may be transferred to one of the pairs of deflecting plates of the cathode-ray oscilloscope 41. For example, the voltage may be applied to the vertical deflecting plates, in which case the oscilloscope spot will move up and down as indicated by the line 43. The $x$-axis of the cathode-ray tube is indicated by the dotted line 44. Depending on the nature of the transient being analyzed, the line 43 is not necessarily symmetrical with respect to the $x$-axis 44 of the cathode-ray spot.

As previously mentioned, the input impulse originally recorded from terminal 12 is played back (in reverse time, though substantially unchanged) by the head 21 through amplifier 24 and is connected by lead 45 to the horizontal deflection plates of the C.R. tube 41. It is apparent that as the recorded transient is played back in reverse time and the signal picked up at the respective terminals 36–40 the C.R. spot will move up and down. At the instant (i.e. $t=0$) when the input impulse passes the head 21, a small horizontal deflection or pip 46 will occur on the C.R. trace. The vertical distance 47 between the pip 46 and the $x$-axis of the cathode-ray tube will be proportional to the Laguerre coefficient ($a_n$) for the respective Laguerre term to which the switch 42 is set. The distance 47 will be positive for some terms and negative for others. Accordingly this distance may be scaled off for the various positions of switch 42 and tabulated to directly give the coefficients of the Laguerre terms which make up the transient being analyzed.

The number of sections required for the ladder network will depend on the precision required, and the make-up of the particular transient under investigation. By tabulating the coefficients the operator can readily observe the degree of convergence of the Laguerre series. If the series converges rapidly only a few terms are necessary for good precision. If the series does not converge rapidly, then it becomes necessary to increase the number of sections in the ladder network 17. It has been found that a satisfactory analysis of the impulse response of a conventional seismograph amplifier requires not more than twenty sections.

It can be shown that Laguerre series whose terms are of a form other than $e^{-t} \cdot L_n(2t)$ may be used to represent a transient, and correspondingly other circuits will then be used for the element 17. The only requirement of the element 17 is that when subjected to a Dirac delta function input (i.e. the impulse of Figure 1) applied at an input point (26 of Figure 4) the voltage developed at the successive sampling points (36, 37, 38, 39, etc., 40 of Figure 4) must be of a form that corresponds to the respective Laguerre functions of the Laguerre series to be used in the analysis. It will further be apparent that a running ground connection 48 (Figure 4) is desirable and convenient in setting up the circuit of this invention.

Figure 5:
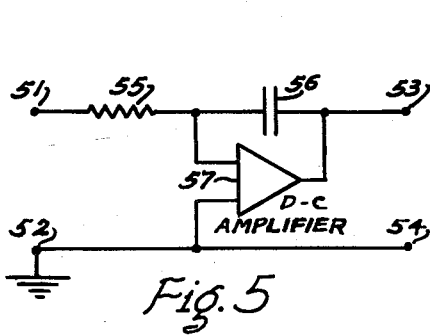
Figures 5 and 6 show wiring diagrams of parts of the circuit of Figure 4.

Figure 5 shows a wiring diagram of the integrator 27 of Figure 4. The input terminals are 51 and 52, which correspond to terminals 26 and ground 48 of Figure 4 respectively. The output terminals of the integrator are 53 and 54. Terminals 52 and 54 may be grounded and this conforms to the running ground 48 of Figure 4. A resistor 55 is connected in series with a condenser 56 between terminals 51 and 53. The condenser 56 is bridged by a direct-current amplifier 57 one side of which may be grounded. It can be shown that the circuit of Figure 5 delivers at terminals 53—54 a signal that is the time integral of the signal applied to terminals 51 and 52. In order to achieve fidelity in the integration the time constant (RC) of the combination of resistor 55 and condenser 56 multiplied by the amplifier gain should be large. By way of example, values of 1 megohm and 0.01 mfd. respectively have been found adequate for analyzing seismic transients. The gain of amplifier 57 is not critical and may, for example, be in the neighborhood of 30,000.

Figure 6:
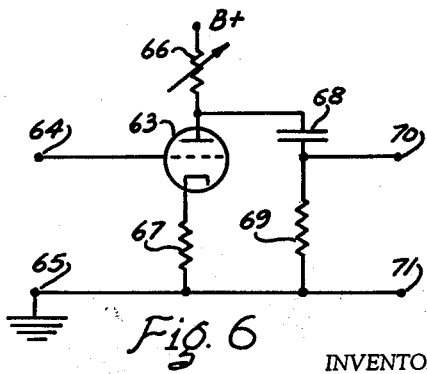

Figure 6 shows a detailed wiring diagram of an amplifier such as may be employed for elements 49, 50, etc. in Figure 4. The amplifier 49 comprises an amplifying device such as tube 63 which may be a triode, as for example one unit of a type 12AU7 tube. One input terminal 65 and one output terminal 71 of the amplifier may be grounded as shown in Figure 6. Inasmuch as this ground is conventional it is not shown on the diagram of Figure 4. The other input terminal 64 is connected to the grid of tube 63. The grid potential of the tube 63 of amplifier 49 is tied down by the resistors 31 and 34 of the circuit of tube 30. A cathode resistor 67 connects the cathode of tube 63 to ground. The resistance of resistor 67 may be of the same order as the cathode resistor 31 and a resistance of 3300 ohms for the resistor 67 has been found adequate. The plate of tube 63 is connected to the B-voltage supply through plate resistor 66 whose value is made much larger than the resistance of resistor 67 and which is preferably made adjustable. A value of about 7000 ohms for resistor 66 has been found satisfactory. The amplified signal is transmitted to the grid of the succeeding tube 30 through a decoupling network comprising a condenser 68 in series with a resistor 69 connected from the plate of tube 63 to ground. The CR product of the capacity of condenser 68 and the resistance of resistor 69 is made very large compared to the CR product for condenser 28 and resistor 29 (or condenser 33 and resistor 34 in the circuit of tube 30). Inasmuch as the circuit of Figure 6 must be capable of good frequency response to very low frequencies, i.e. lower than the lowest frequency of interest in the signal to be analyzed, it is preferred that the CR product for capacity 68 and resistor 69 be very large. By way of example, a capacity of 2 mfd. for the condenser 68 and a resistance of 0.5 megohms for the resistor 69 has been found satisfactory for analyzing seismic transients. The values given for the various components of Figure 6 are by way of example only, and these will result in an amplifier having substantially flat response down to a frequency of about 1 c.p.s.

In the circuit of Figure 4 it will be apparent that a certain amount of attenuation will occur in the tubes 30, etc. The purpose of the amplifiers 49, 50, etc. (of the form shown in Figure 6) which follow each tube 30 is to amplify the signal so that after attenuation in tube 30 the signal maintains its original amplitude. Accordingly the amplification of each amplifier 49, 50, etc. is adjusted to provide in each section the proper amplification. The amplification of the amplifiers of Figure 6 may be adjusted in any one of a variety of conventional ways, as for example by adjustment of the plate resistor 66. Inasmuch as the tubes 30 may vary slightly in the respective sections of the ladder network, each ladder section is adjusted individually. The gain of each respective amplifier 49, 50, etc. is adjusted so that there is no net attenuation through the section. For example, for the first ladder section the gain of amplifier 49 is adjusted so that the voltage output of the section at point 37 is the same amplitude as the voltage input of the section at point 36. The adjustment may easily be made by applying a steady sinusoidal signal of frequency within the range of frequencies of interest to the input of each respective ladder section and adjusting the gain of the amplifier in that section by adjusting resistor 66 (see Figure 6) so that the output of the section is equal to the input as measured with a vacuum tube voltmeter. Best precision is attained if this adjustment is made without disconnecting the respective ladder sections from each other.

While the above description of the use of this invention is directed to an analysis of an electrical device exemplified by device 10 of Figure 3, the invention can be used to analyze any transient that can be satisfactorily recorded on the magnetic tape 19. Thus, for example, mechanical displacements of a mechanical system may be recorded on tape 19 by the use of a vibrometer as is well known. The invention can then be used to analyze the transient behavior of the mechanical system.

The mathematical theory on which the operation of the Laguerre analyzer of this invention is based may be briefly stated as follows. We wish to find the Laguerre series expansion of a given transient $W(t)$, namely $$W(t) = \sum_{n=0}^{n=\infty} a_n \cdot l_n(t)$$

If the transient $W(t)$ were fed into a filter having an impulse response that corresponds to the $k$'th Laguerre function, the output $E'(t)$ of the filter would be a convolution integral of the transient and the $k$'th Laguerre function, namely $$E'(t) = \int_0^\infty W(t-\tau) \cdot l_k(\tau) \cdot d\tau$$

However, when the transient is fed into the filter in the reversed time sequence as in this invention, the output $E_{out}(t)$ of the filter is the cross-correlation of the two functions, namely $$E_{out}(t) = \int_0^\infty W(\tau-t) \cdot l_k(\tau) \cdot d\tau$$

When the argument ($t$) has the value zero (i.e. when $t=0$) this reduces to $$E_{out}(0) = \int_0^\infty W(\tau) \cdot l_k(\tau) \cdot d\tau$$

and substituting for $W(t)$ its desired expansion $$E_{out}(0) = \sum_{n=0}^{n=\infty} a_n \int_0^\infty l_n(t) \cdot l_k(t) \cdot dt$$

From the orthogonal property of the Laguerre functions the integral in the above expression is zero except when $n=k$, so that $$E_{out}(0) = \sum_{n=0}^{n=\infty} a_n \cdot \begin{bmatrix} 0 \text{ if } n \neq k \\ 1 \text{ if } n = k \end{bmatrix} = a_k$$

Consequently, by the orthogonal property of Laguerre functions, the value of the cross-correlation integral at zero delay ($t=0$) is directly proportional to the sought-for amount of $k$'th the Laguerre function present in $W(t)$ the original transient. This is what the method and apparatus of this invention carries out.

What I claim as my invention is:

1. Apparatus for performing a Laguerre analysis of a transient phenomenon which comprises means recording the transient phenomenon in phonographically-reproducible form on a recording medium, means recording in phonographically-reproducible form on said recording medium the instant of initiation of the transient phenomenon, reversible drive means moving said recording medium, means reproducing said recording when said recording medium is moved in a direction opposite to that with which said transient phenomenon was recorded, means connecting said reproducing means to an electrical network, said network being characterized that if excited by an impulse of the form $$\underset{\Delta t \longrightarrow 0}{\text{limit}} [e_i \cdot \Delta t] = 1$$

said network will generate at a plurality of terminal points voltages that are respectively of the form of Laguerre functions of successive degree, instantaneous voltage-measuring means, means connecting said voltage-measuring means successively to said terminal points, and means for measuring the instantaneous voltages at said respective terminal points at the recorded instant of initiation of said transient phenomenon.

2. Apparatus for performing a Laguerre analysis of a transient phenomenon recorded in phonographically-reproducible form in time coordination with a similar record of the instant of initiation of the transient which comprises electrical phonographic reproducing means engaging said record, means effecting relative movement between the recording and said reproducing means in a direction opposite to the direction in which the recording was made, an electrical network having input terminals and characterized that if an impulse of the form $$\underset{\Delta t \longrightarrow 0}{\text{limit}} [e_i \cdot \Delta t] = 1$$

is applied to said input terminals said network will generate at a plurality of output terminal points voltages that are respectively of the form of Laguerre functions of successive degree, means connecting said reproducing means to said input terminals of said network, instantaneous voltage-measuring means, and means connecting said voltage-measuring means successively to said output terminal points of said network.

3. Apparatus for performing a Laguerre analysis of a transient phenomenon recorded in phonographically-reproducible form in time coordination with a similar record of the instant of initiation of the transient which comprises first electrical phonographic reproducing means engaging the record of the transient, means effecting relative movement between the recording and said reproducing means in a direction opposite to the direction in which the recording was made, an electrical network having input terminals and characterized that if an impulse of the form $$\underset{\Delta t \longrightarrow 0}{\text{limit}} [e_i \cdot \Delta t] = 1$$

is applied to said input terminals said network will generate at a plurality of output terminal points voltages that are respectively of the form of Laguerre functions of successive degree, means connecting said first reproducing means to said input terminals of said network, instantaneous voltage measuring means, means connecting said voltage-measuring means successively to said output terminal points of said network, second electrical phonographic reproducing means engaging the record of the instant of initiation of the transient, means connecting said second reproducing means to said instantaneous voltage-measuring means, and indicating means connected to said instantaneous voltage-measuring means identifying the instant of initiation of the transient phenomena in the indication of said instantaneous voltage-measuring means.

References Cited in the file of this patent
UNITED STATES PATENTS
2,582,851   Ruge _____ Jan. 15, 1952

UNITED STATES PATENT OFFICE
CERTIFICATION OF CORRECTION

Patent No. 2,963,647

December 6, 1960

William C. Dean

It is hereby certified that error appears in the above numbered patent requiring correction and that the said Letters Patent should read as corrected below.

Column 6, line 71, after "of the same" insert -- section. --; line 72, before "described" insert -- The amplifier 49 is conventional and will be --.

Signed and sealed this 9th day of May 1961.

(SEAL)
Attest:

ERNEST W. SWIDER
Attesting Officer

DAVID L. LADD
Commissioner of Patents